US008762958B2

(12) United States Patent
Golender et al.

(10) Patent No.: US 8,762,958 B2
(45) Date of Patent: *Jun. 24, 2014

(54) SYSTEM AND METHOD FOR TROUBLESHOOTING SOFTWARE CONFIGURATION PROBLEMS USING APPLICATION TRACING

(75) Inventors: Valery Golender, Kfar Saba (IL); Ido Ben Moshe, Herzlia (IL); Shlomo Wygodny, Ramon Hasharon (IL)

(73) Assignee: Identify Software, Ltd., Petach-Tikva (IL)

( * ) Notice: Subject to any disclaimer, the term of this patent is extended or adjusted under 35 U.S.C. 154(b) by 895 days.

This patent is subject to a terminal disclaimer.

(21) Appl. No.: 12/135,678

(22) Filed: Jun. 9, 2008

(65) Prior Publication Data

US 2008/0244534 A1 Oct. 2, 2008

Related U.S. Application Data

(63) Continuation of application No. 10/703,098, filed on Nov. 6, 2003, now Pat. No. 7,386,839.

(60) Provisional application No. 60/424,365, filed on Nov. 6, 2002.

(51) Int. Cl.
 *G06F 9/44* (2006.01)
(52) U.S. Cl.
 USPC ........................................................ 717/131
(58) Field of Classification Search
 USPC ......... 717/124–125, 128, 174, 109, 175, 169, 717/176, 127, 158, 136, 162, 131; 714/38, 714/37, 4.1, 45, 38.12, 46, 38.11, 733; 709/224, 227, 219, 203; 719/331; 715/513; 702/186

See application file for complete search history.

(56) References Cited

U.S. PATENT DOCUMENTS

| | | | |
|---|---|---|---|
| 4,503,495 A | 3/1985 | Boudreau | |
| 4,511,960 A | 4/1985 | Boudreau | |
| 4,598,364 A | 7/1986 | Gum et al. | |
| 4,782,461 A | 11/1988 | Mick et al. | |
| 4,879,646 A | 11/1989 | Iwasaki et al. | |
| 5,021,949 A | 6/1991 | Morten et al. | |
| 5,121,489 A | 6/1992 | Andrews | |
| 5,193,180 A | 3/1993 | Hastings | |
| 5,265,254 A | 11/1993 | Blasciak et al. | |
| 5,297,274 A | 3/1994 | Jackson | |
| 5,335,344 A | 8/1994 | Hastings | |

(Continued)

OTHER PUBLICATIONS

Appelbe et al., "Integrating tools for debugging and developing multitasking programs," ACM, 1993, pp. 78-88.

(Continued)

*Primary Examiner* — Tuan A Vu

(57) ABSTRACT

A software system is disclosed which facilitates the process of tracing the execution paths of a program, called a client or application. Trace data corresponding to selected system resources that interact with the execution of the application is collected during the tracing operation and stored in an application signature. A computer system user can generate trace options, trace the application, and compare the application signature to a known software configuration. The application signature is compared to a reference signature created by tracing the execution of the application on a system with the known software configuration. In another embodiment, the application signature is compared to a static configuration of a reference computer.

12 Claims, 12 Drawing Sheets

(56) References Cited

U.S. PATENT DOCUMENTS

| | | | |
|---|---|---|---|
| 5,347,649 A | 9/1994 | Alderson | |
| 5,386,522 A | 1/1995 | Evans | |
| 5,386,565 A | 1/1995 | Tanaka et al. | |
| 5,394,544 A | 2/1995 | Motoyama et al. | |
| 5,408,650 A | 4/1995 | Arsenault | |
| 5,410,685 A | 4/1995 | Banda et al. | |
| 5,421,009 A | 5/1995 | Platt | |
| 5,446,876 A | 8/1995 | Levine et al. | |
| 5,450,586 A | 9/1995 | Kuzara et al. | |
| 5,465,258 A | 11/1995 | Adams | |
| 5,481,740 A | 1/1996 | Kodosky | |
| 5,483,468 A | 1/1996 | Chen et al. | |
| 5,513,317 A | 4/1996 | Borchardt et al. | |
| 5,526,485 A | 6/1996 | Brodsky | |
| 5,533,192 A | 7/1996 | Hawley et al. | |
| 5,551,037 A | 8/1996 | Fowler et al. | |
| 5,574,897 A | 11/1996 | Hermsmeier et al. | |
| 5,581,697 A | 12/1996 | Gramlich et al. | |
| 5,590,354 A | 12/1996 | Klapproth et al. | |
| 5,612,898 A | 3/1997 | Huckins | |
| 5,615,331 A | 3/1997 | Toorians et al. | |
| 5,632,032 A | 5/1997 | Ault et al. | |
| 5,642,478 A | 6/1997 | Chen et al. | |
| 5,651,111 A * | 7/1997 | McKeeman et al. | 714/38.1 |
| 5,657,438 A | 8/1997 | Wygodny et al. | |
| 5,732,210 A | 3/1998 | Buzbee | |
| 5,740,355 A | 4/1998 | Watanabe et al. | |
| 5,745,748 A | 4/1998 | Ahmad et al. | |
| 5,758,062 A * | 5/1998 | McMahon et al. | 714/38.11 |
| 5,771,385 A | 6/1998 | Harper | |
| 5,781,720 A | 7/1998 | Parker et al. | |
| 5,848,274 A | 12/1998 | Hamby et al. | |
| 5,857,071 A * | 1/1999 | Haley et al. | 714/38.1 |
| 5,867,643 A | 2/1999 | Sutton | |
| 5,870,606 A | 2/1999 | Lindsey | |
| 5,896,535 A | 4/1999 | Ronstrom | |
| 5,903,718 A | 5/1999 | Marik | |
| 5,928,369 A | 7/1999 | Keyser et al. | |
| 5,938,778 A | 8/1999 | John, Jr. et al. | |
| 5,940,618 A | 8/1999 | Blandy et al. | |
| 5,960,198 A | 9/1999 | Roediger et al. | |
| 5,974,254 A * | 10/1999 | Hsu | 717/109 |
| 5,983,366 A | 11/1999 | King | |
| 6,003,143 A | 12/1999 | Kim et al. | |
| 6,026,433 A | 2/2000 | D'Arlach et al. | |
| 6,026,438 A | 2/2000 | Piazza et al. | |
| 6,047,124 A | 4/2000 | Marsland | |
| 6,065,043 A | 5/2000 | Domenikos et al. | |
| 6,108,330 A | 8/2000 | Bhatia et al. | |
| 6,202,199 B1 * | 3/2001 | Wygodny et al. | 717/125 |
| 6,219,826 B1 | 4/2001 | De Pauw et al. | |
| 6,237,138 B1 | 5/2001 | Hameluck et al. | |
| 6,253,317 B1 | 6/2001 | Knapp et al. | |
| 6,263,456 B1 | 7/2001 | Boxall et al. | |
| 6,282,701 B1 | 8/2001 | Wygodny et al. | |
| 6,321,375 B1 | 11/2001 | Blandy | |
| 6,360,331 B2 | 3/2002 | Vert et al. | |
| 6,374,369 B1 | 4/2002 | O'Donnell | |
| 6,415,394 B1 | 7/2002 | Fruehling et al. | |
| 6,467,052 B1 | 10/2002 | Kaler et al. | |
| 6,490,696 B1 | 12/2002 | Wood et al. | |
| 6,507,805 B1 | 1/2003 | Gordon et al. | |
| 6,513,155 B1 * | 1/2003 | Alexander et al. | 717/124 |
| 6,557,011 B1 | 4/2003 | Sevitsky et al. | |
| 6,606,735 B1 * | 8/2003 | Richardson et al. | 716/112 |
| 6,611,946 B1 * | 8/2003 | Richardson et al. | 716/112 |
| 6,634,001 B2 | 10/2003 | Anderson et al. | |
| 6,738,970 B1 * | 5/2004 | Kruger et al. | 717/175 |
| 6,865,508 B2 | 3/2005 | Ueki et al. | |
| 6,874,110 B1 * | 3/2005 | Camarota | 714/733 |
| 6,907,546 B1 * | 6/2005 | Haswell et al. | 714/38.11 |
| 6,922,821 B1 * | 7/2005 | Nemecek | 716/136 |
| 7,058,928 B2 | 6/2006 | Wygodny et al. | |
| 7,089,536 B2 * | 8/2006 | Ueki et al. | 717/131 |
| 7,114,150 B2 | 9/2006 | Dimpsey et al. | |
| 7,373,636 B2 * | 5/2008 | Barry et al. | 717/124 |
| 7,386,839 B1 | 6/2008 | Golender et al. | |
| 2002/0087949 A1 | 7/2002 | Golender et al. | |
| 2003/0005414 A1 * | 1/2003 | Elliott et al. | 717/128 |
| 2003/0037314 A1 * | 2/2003 | Apuzzo et al. | 717/125 |
| 2003/0046029 A1 * | 3/2003 | Wiener et al. | 702/186 |
| 2003/0051235 A1 * | 3/2003 | Simpson | 717/174 |
| 2003/0088854 A1 | 5/2003 | Wygodny et al. | |
| 2003/0097650 A1 * | 5/2003 | Bahrs et al. | 717/124 |
| 2003/0110253 A1 * | 6/2003 | Anuszczyk et al. | 709/224 |
| 2003/0135789 A1 * | 7/2003 | DeWitt et al. | 714/38 |
| 2003/0177442 A1 * | 9/2003 | Lou | 715/513 |
| 2003/0204836 A1 * | 10/2003 | Srivastava et al. | 717/124 |
| 2004/0060043 A1 | 3/2004 | Frysinger et al. | |
| 2006/0150162 A1 | 7/2006 | Mongkolsmai et al. | |
| 2006/0242627 A1 | 10/2006 | Wygodny et al. | |
| 2008/0244534 A1 | 10/2008 | Golender et al. | |

OTHER PUBLICATIONS

Bates, Peter C., "Debugging Heterogeneous Distributed Systems Using Event-Based Models of Behavior," ACM Transactions on Computer Systems, vol. 13, No. 1, Feb. 1995, pp. 1-31.

Bruegge, C.P. et al., "A Framework for Dynamic Program Analyzers," OOPSLA, 1993, pp. 62-85.

Forrest, S., et al., "A sense of self for Unix processes," Proceedings of 1996 IEEE Symposium on Computer Security and Privacy, 1996, pp. 120-128.

Goldszmidt et al, "Interactive blackbox debugging for concurrent language", ACM pp. 271-282, 1990.

Lee et al., "Learning Patterns from Unix Process Execution Traces for Intrusion Detection," AAAI Technical Report 1997 (retrieved on Jun. 11, 2009) Retrieved from the Internet: URL: https://www.aaai.org/Papers/Workshops/1997/WS-97-07/WS97-07-010.pdf.

Meier, Michael S., et al., "Experiences with Building Distributed Debuggers," SPDT, 1996, pp. 70-79.

Mukherjea, Sougata et al., "Applying Algorithm Animation Techniques for Program Tracing, Debugging, and Understanding," IEEE, 1993, pp. 456-465.

Notice of Allowance dated Feb. 28, 2006 from Related U.S. Appl. No. 10/057,002.

Notice of Allowance dated Sep. 11, 2000 from Related U.S. Appl. No. 09/126,120.

Notice of Allowance dated Sep. 11, 2000 from Related U.S. Appl. No. 09/126,126.

Redell, "Experience with Topaz teledebugging", ACM SIGPLAN & SIGOPS, pp. 35-44, 1990.

Wismuller, "Debugging of globally optimized programs using data flow analysis", ACM SIGPLAN, Apr. 1994, pp. 278-289.

Advisory Action dated Dec. 11, 2009 from Related U.S. Appl. No. 11/165,442.

Advisory Action dated Oct. 20, 2008 from Related U.S. Appl. No. 10/808,760.

Advisory Action dated Oct. 7, 2005 from Related U.S. Appl. No. 09/799,338.

Office Action dated Apr. 11, 2004 from Related U.S. Appl. No. 09/799,338.

Office Action dated Aug. 25, 2005 from Related U.S. Appl. No. 10/057,002.

Office Action dated Aug. 6, 2008 from Related U.S. Appl. No. 10/808,760.

Office Action dated Dec. 31, 2007 from Related U.S. Appl. No. 10/808,760.

Office Action dated Feb. 10, 2000 from Related U.S. Appl. No. 09/126,120.

Office Action dated Feb. 18, 2009 from Related U.S. Appl. No. 11/165,442.

Office Action dated Jan. 14, 2000 from Related U.S. Appl. No. 09/126,126.

Office Action dated Jan. 2, 2009 from Related U.S. Appl. No. 10/808,760.

Office Action dated Jan. 23, 2006 from Related U.S. Appl. No. 09/799,338.

(56) References Cited

OTHER PUBLICATIONS

Office Action dated Jan. 9, 2007 from Related U.S. Appl. No. 09/799,338.
Office Action dated Jun. 22, 2009 from Related U.S. Appl. No. 10/808,760.
Office Action dated Jun. 6, 2005 from Related U.S. Appl. No. 09/799,338.
Office Action dated Mar. 1, 2005 from Related U.S. Appl. No. 10/057,002.
Office Action dated Sep. 1, 2006 from Related U.S. Appl. No. 09/799,338.
Office Action dated Sep. 27, 2007 from Related U.S. Appl. No. 09/799,338.
Office Action dated Sep. 4, 2009 from Related U.S. Appl. No. 11/165,442.
Abramson D. et al., "A Debugging Tool for Software Evolution," CASE-95, 7th International Workshop on Computer-Aided Software Engineering, Jul. 1995.
Geer, C.P. et al., "IBM Technical Disclosure Bulletin: Instruction Stream Trace," vol. 26, No. 11, May 1984, pp. 6217-6620.
Hunt, TA, "IBM Technical Disclosure Bulletin: General Trace Facility," vol. 15, No. 8, Jan. 1973, pp. 2446-2448.
Harward, JR., LD., "IBM Technical Disclosure Bulletin: PL/1 Trace Program," vol. 13, No. 4, Sep. 1970, pp. 855-857.
Larus, James R., "Efficient Program Tracing," IEEE Software magazine, May 1993, pp. 52-61.
Malony, Allen D. et al., "Traceview: A Trace Visualization Tool," IEEE Software magazine, Sep. 1991, pp. 19-28.
Martonosi, Margaret et al., "Effectiveness of Trace Sampling for Performance Debugging Tools," 1993, pp. 248-259.
Netzer, Robert H.B. et al., "Optimal Tracing and Incremental Reexecution for Debugging Long-Running Programs," ACM SIGPLAN '94 Conference on Programming Language Design and Implementation (PLDI), Jun. 20-24, 1994, Orlando, Florida, pp. 313-325.
Netzer, Robert H.B. et al., "Optimal Tracing and Replay for Debugging Shared-Memory Parallel Programs," ACM/ONR Workshop on Parallel and Distributed Debugging, May 17-18, 1993, San Diego, California, pp. 1-12.
Plattner, Bernhard et al., "Monitoring Program Execution: A Survey," IEEE Software magazine, Nov. 1981, pp. 76-93.
Reiss, Steven P., "Trace-Based Debugging," Automated and Algorithmic Debugging Workshop, May 3-5, 1993, Linkoping, Sweden, pp. 305-314.
Rosenberg, Jonathan B. "How Debuggers Work: Algorithms, Data Structures, and Architecture," John Wiley & Sons, Inc. 1996, Chapter 5 (pp. 95-106), Chapter 7 (pp. 135-149), Chapter 9 (pp. 173-184), and Chapter 11 (pp. 191-204).
Schieber, Colleen D. et al., "Ratchet: Real-Time Address Trace Compression Hardware for Extended Traces," Performance Evaluation Review, vol. 23, Nos. 3 and 4, Apr. 1994, pp. 22-32.
Soule, K, "IBM Technical Disclosure Bulletin: Algorithm for Tracing Execution Paths to a Given Location in a Program," vol. 14, No. 4, Sep. 1971, pp. 1016-1019.
Spinellis, Diomidis, "Tracing: A Tool for Logging Operating System Call Transaction," Operating System Review, vol. 28, No. 4, Oct. 1994, pp. 56-63.
Timmerman M. et al., "High Level Tools for the Debugging of Real-Time Multiprocessor Systems," ACM/ONR Workshop on Parallel and Distributed Debugging, May 17-18, 1993, San Diego, California, pp. 151-158.
Tsai, Jeffrey J.P. et al., "A Noninvasive Architecture to Monitor Real-Time Distributed Systems," IEEE Software, Mar. 1990, pp. 11-23.
Ueki K. et al., "A Probe Debugging Method," Technical Report of Ieice, Jul. 2000.
Wilner, David, "Windview: A Tool for Understanding Real-Time Embedded Software Through System Visualization," ACM SIGPLAN Notices, vol. 30, No. 11, Nov. 1995, pp. 117-123.
Office Action dated Jun. 29, 2007 from Related U.S. Appl. No. 10/703,098.
Notice of Allowance dated Feb. 6, 2008 from Related U.S. Appl. No. 10/703,098.
Netzer, Robert H.B. et al., "Optimal Tracing and Replay for Debugging Message-Passing Parallel Programs," IEEE, 1992, pp. 502-511.
Jeffrey K. Hollingsworth and Barton P. Miller, "An Adaptive Cost System for Parallel Program Instrumentation"—Proceedings of the Second International Euro-Par Conference on Parallel Processing—vol. 1, 1996, 10 pages.
Paolo Bellavista, Antonio Corradi, and Cesare Stefanelli, "Java for On-Line Distributed Monitoring of Heterogeneous Systems and Services"—The Computer Journal, vol. 45, No. 6, 2002, 13 pages.
Martin Shulz, John May, and John Gyllenhaal, "DynTG: A Tool for Interactive, Dynamic Instrumentation"—ICCS 2005, LNCS 3515, 2005, 9 pages.
Daniel Reed et al. "An Overview of the Pablo Performance Analysis Environment"—University of Illinois Department of Computer Science, Nov. 7, 1992, 45 pages.
Celine Boutros Saab, Xavier Bonnaire, and Bertil Folliot "Phoenix: A Self Adaptable Monitoring Platform for Cluster Management"—Cluster Computing 5, 2002, 11 pages.
Weiming Gu et al. "Falcon: On-line monitoring and Steering of Large-Scale Parallel Programs", Proceedings of the Fifth Symposium on the Frontiers of Massively Parallel Computation, 1995, 38 pages.

\* cited by examiner

SYSTEM AND METHOD FOR TROUBLESHOOTING SOFTWARE CONFIGURATION PROBLEMS USING APPLICATION TRACING

REFERENCE TO RELATED APPLICATION

The present application is a continuation of application Ser. No. 10/703,098, filed Nov. 6, 2003, titled "SYSTEM AND METHOD FOR TROUBLESHOOTING SOFTWARE CONFIGURATION PROBLEMS USING APPLICATION TRACING, now U.S. Pat. No. 7,386,839 which claims priority benefit of Application No. 60/424,365, filed Nov. 6, 2002, titled "SYSTEM AND METHOD FOR TROUBLESHOOTING SOFTWARE CONFIGURATION PROBLEMS USING APPLICATION TRACING," the disclosure of which is incorporated herein by reference in its entirety.

BACKGROUND OF THE INVENTION

1. Field of the Invention

The present invention relates to software tools for assisting software developers and users in the task of monitoring and analyzing the execution of computer programs, such as during the troubleshooting process.

2. Description of the Related Art

A drawback of current monitoring or troubleshooting systems is the inability to analyze software configuration problems in a particular computer system. The computing model used in modem environments such as Microsoft Windows, which is based on usage of numerous sophisticated and error-prone applications having many components interacting in a complex way, requires significant effort for system service and support. Many of these problems are software configuration errors that commonly occur when users add new programs and devices to their computers. Similarly, software configuration errors may occur due to the corruption of certain important system files, resources, and setups. Another source of software configuration errors is "unexpected" user behavior that was not envisioned by the software developers. For example, a user may inadvertently delete a file needed by the application.

In order to solve system software configuration problems, a number of solutions have been proposed, including: using application "DNA" or "fingerprint" files that represent an acceptable configuration of a system just after installation of an application; periodically copying disk snapshots and rolling back to the last known acceptable system state in the event of an error; and incorporating rollback functionality into Windows installer programs. However, these solutions have a number of disadvantages, including the need for manual creation and administration of application fingerprints, which requires the user to specify which configuration components are used by the applications. The user typically does not have this information. Another drawback is the need for centralized servers to store correct configurations and disk snapshots. Generally, solutions known in the art for troubleshooting software configuration problems are expensive and complex to implement.

Thus, it would be advantageous to develop a technique and system for monitoring the execution of computer programs in order to analyze, correct and prevent software configuration errors.

SUMMARY OF THE INVENTION

The present invention overcomes these and other problems associated with software configuration errors in a computer system by analyzing execution traces of software programs. In one embodiment, a software system for troubleshooting a configuration problem of a software application is provided. The software system includes a first code module that attaches to a first memory image of the application and traces a first execution of the application which uses a first software configuration that is properly functioning. Data reflecting the first execution is stored in a first application signature containing data representing properties of first system resources that interact with the application during the first execution, as discovered during the tracing done by the first code module. The software system further includes a second code module that attaches to a second memory image of the executable code representation of the application and traces a second execution of the application which uses a second software configuration that is malfunctioning. Data reflecting the second execution is stored in a second application containing data representing properties of second system resources that interact with the application during the second execution. The software system further includes a third code module configured to correlate the first application signature to the second application signature to help a computer system user identify the reason for the malfunction.

In another embodiment, a method for analyzing a software configuration on a computer system is provided wherein an execution of an application computer program on the computer system is traced by attaching an application program interface tracer to the application. Trace data relating to system resources accessed during the execution of the application is collected and stored in an application signature. Reference data from at least one source is generated and differences between the application signature and the reference data are selectively analyzed.

In another embodiment, a software execution tracing system for analyzing software configuration errors in a computer system includes a first code module configured to attach to a properly functioning application and to generate trace data corresponding to system resources configured to interact with an execution of the application. The software system further includes a second code module configured to display the system resources together with first properties corresponding to a failed execution of the application caused by a malfunctioning software configuration. The software system further includes a third code module configured to display the system resources together with the first properties and second properties corresponding to a successful execution of the application on a known software configuration to thereby allow a user to compare the first properties to the second properties.

In another embodiment, a software system for troubleshooting a configuration problem of a software application is provided which includes a first code module configured to trace the execution of the application by attaching to the executable code representation of the application and to generate traced data corresponding to a plurality of system resources accessed by the application during execution. The software system also includes second code module configured to correlate the traced data to reference data corresponding to a known software configuration and to display the correlated traced data and reference data for analysis.

In another embodiment, a system for analyzing differences in a first software configuration and a second software configuration is provided. The system includes tracing means that attaches to a memory image of an application for tracing an execution of the application using the first software configuration and for storing properties of traced system objects in an application signature. The tracing system also includes a means for displaying first properties corresponding to the traced system objects of the application signature in human-readable form. The tracing system further includes a means for correlating properties of the traced system objects with properties of reference system objects corresponding to the second software configuration and for displaying the first properties together with second properties corresponding to reference system objects so that the first properties can be compared with the second properties.

BRIEF DESCRIPTION OF THE DRAWINGS

A software system which embodies the various features of the invention will now be described with reference to the following drawings.

In the drawings, like reference numbers are used to indicate like or functionally similar elements. In addition, the first digit or digits of each reference number generally indicate the figure number in which the referenced item first appears.

DETAILED DESCRIPTION

In an embodiment of the invention, one or more application computer programs are traced in order to identify and analyze computer system and/or application configurations. Analysis of an execution trace allows creation of a data structure referred to herein as an "application signature" that includes traced data corresponding to system resources configured to interact with an application during execution. The application signature includes system objects and/or data such as, by way of example only and not by limitation, files, file systems, one or more registry entries, registry keys, application components, shared libraries, databases, other running processes, remote machines, web sites and web services, general system information, environment variables, system services, and kernel mode device drivers.

In one embodiment, comparison of application signatures for two or more similar executions of an application on "problematic" and "good" computers or systems allows identification of differences in the computers, systems and/or application configurations that cause an application failure. In another embodiment, an application signature derived from a problematic computer or system is compared with a static configuration of a reference computer having a known good configuration or capable of running the programs correctly.

Creating an Application Signature

Figure 1:
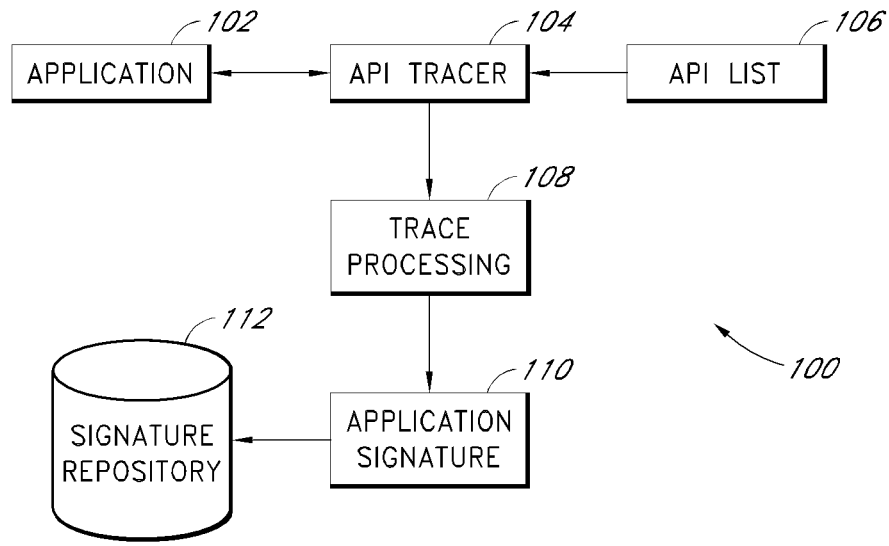
FIG. 1 is a block diagram that illustrates an application signature creation process.

FIG. 1 is a block diagram of an application signature creation process 100. The process 100 includes an API ("Application Programmer Interface") tracer 104 code module attaching to an application 102, using the API tracer 104 to trace system calls from an API list 106, and performing trace processing 108 to create an application signature 110 data structure. The application signature 110 is configured to store information about system objects accessed or used by the application 102 during execution. The process 100 can also include storing the application signature 110 in a signature repository 112 configured to store one or more application signature 110.

Figure 6:
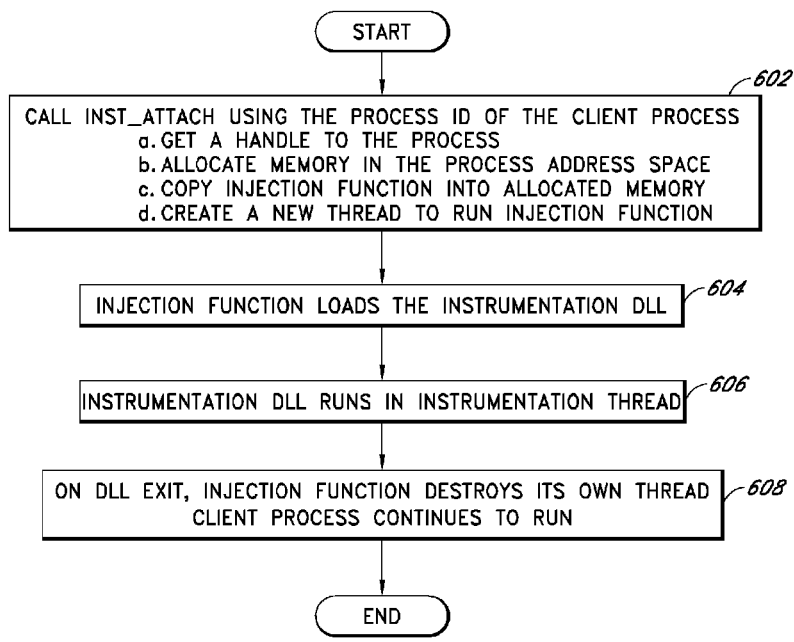
FIG. 6 is a flowchart which illustrates the process of attaching to (hooking) a running process.
Figure 7:
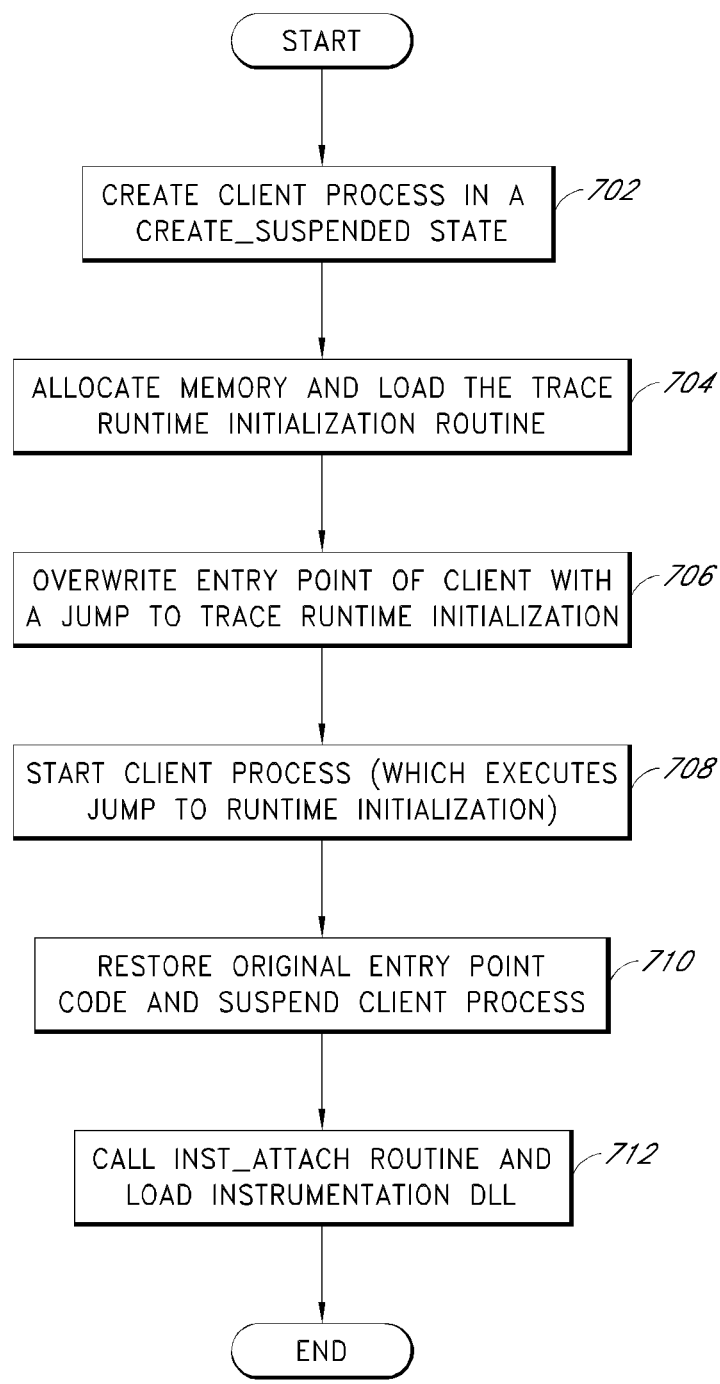
FIG. 7 is a flowchart that illustrates the process of loading an executable file and attaching to (hooking) the program.

The API tracer 104 is configured to trace the system calls of the application 102. The system calls traced are included in the API list 106. The traced API list 106 includes operating system (OS) functions that are used by the application 102 for access to system objects reflected in the application signature 110. Tracing can be accomplished by a variety of different API tracers, methods and programs including those described herein. In one embodiment, the API Tracer 104 attaches to the application 102 at runtime, as described in connection with FIGS. 6 and 7.

In one embodiment, the target OS is Microsoft Windows including Windows 95, 98, NT, 2000, XP, Windows 2003, etc. However, it should be understood that the invention is not limited to a Windows OS. The API tracer 104 is configured to trace Windows API functions such as, for example, file operations, window registry operations, component object model (COM) operations, process and library operations, and additional system information. The trace processing 108 function can be configured to process this information for storage in the application signature 110.

In one embodiment, traced file operations include Create-File, OpenFile, ReadFile, ReadFileEx, CreateFileMapping, SetEndOfFile, FindFirstFile, FindFirstFileEx, CopyFileEx, MoveFileEx, and other system functions configured to access, copy, save or modify a file or group of files. For each file configured to interact with the execution of the application through a traced file operation, trace processing 108 of the traced file operations information includes determining information such as a file name and extension. Information such as file attributes, file size, creation time, modification time, control sum, and file state (e.g., exists, missing, dynamic, etc.) can be included in the application signature 110. Files can be divided into groups including, for example, applications and application extensions (e.g., files with extensions exe, dll, sys, ocx, bat, drv, com), folders, and other files (mainly data files). If the file state is changed during the execution, the corresponding application signature 110 entry for the file is marked as dynamic. In one embodiment, absolute directory names are substituted by symbolic names, such as SystemDirectory, WindowsDirectory, and ApplicationDirectory.

Traced Windows registry operations include RegSetValue, RegSetValueEx, RegCreateKey, RegOpenKey, RegQueryInfoKey, RegQueryValue, RegQueryValueEx, RegEnumKey, RegEnumValue, or any other registry function. Trace processing 108 of the traced Windows registry operations information includes determining the registry key name and value if it was used by the application. For each registry key, information such as name, type, size, data, and state (e.g., exists or missing) can be included in the application signature 110.

Traced COM operations include CoCreateInstance, CoCreateInstanceEx, CoGetClassObject, OleCreateFromData, OleCreateFromFile, OleLoad, and other system functions configured to interact with COM operations. Trace processing 108 of traced COM operations information includes determining a COM object GUID. In addition, ProgID and InprocServer32 information (e.g., dll name and threading model) can be retrieved from the registry.

Traced process and library operations include CreateProcess, OpenProcess, LoadLibrary, or any other system function configured to interact with process and library operations. Trace processing 108 of traced process and library information includes determining a module file name and extension. For each module, information such as module name, attributes, size, control sum, creation time, modification time, linker version, OS version, product version, language, file description, product name, company name, original filename, internal name, and legal copyright can be included in the application signature 110.

In one embodiment, additional system information traced by the API tracer 104, processed by the trace processing function 108 and stored in the application signature 110 include, but is not limited to, hardware information, OS data, drive information, environment variables, services, drivers, Internet server and browser configuration information, COM configuration information, object linking and embedding (OLE) configuration information, and remote procedure call (RPC) configuration information. Hardware information includes the number of processors, CPU type, display resolution, installation information, and CPU frequency. OS system data includes Windows version, Windows mode, swap file size, Windows directory, system directory, and service pack. Drive information includes file system, total size, free space, and mapped network drives. Internet server configuration information includes WEB applications path and protection. Internet browser configuration information includes security and privacy settings and whether Java applets engine is operative.

Analyzing an Application Signature

Figure 2:
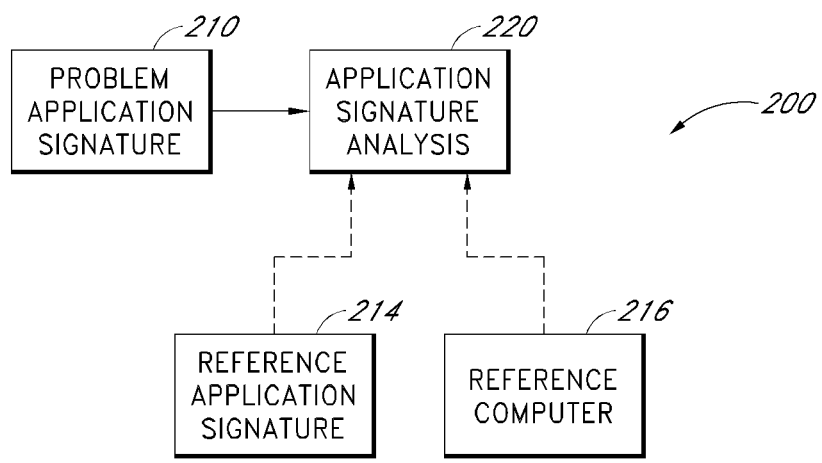
FIG. 2 is a block diagram that illustrates a process for analyzing application signatures.

An application signature 110 can be analyzed to determine the cause of an application failure. FIG. 2 is a block diagram of a process 200 whereby a "problem application signature" 210 corresponding to a failed execution of an application (not shown), such as the application 102 shown in FIG. 1, undergoes an application signature analysis 220 function. In one embodiment, the application signature analysis 220 function is configured to detect known errors in the problem application signature 210 corresponding to a known erroneous application, system, or computer configuration. Such errors may include, by way of example only, a missing module or an incorrect file permission.

In another embodiment, the application signature analysis 220 function is configured to compare the problem application signature 210 with a "reference application signature" 214 corresponding to a normal or acceptable execution of the application. The comparison procedure is configured to detect differences in the states and attributes of traced API objects. Revealed differences between the problem application signature 210 and reference application signature 214 allow detection and correction of configuration problems causing an application failure. In yet another embodiment, the application signature analysis 220 function is configured to compare the problem application signature 210 with a static configuration of a "reference computer" 216. For example, the application signature analysis 220 function can be configured to match objects of the problem application signature 210 to corresponding objects located on the reference computer 216 and to compare properties of the matched objects to discover differences.

Comparison of the problem application signature 210 to the reference application signature 214 and/or the reference computer 216 can reveal numerous configuration differences. In the course of object comparison, object states can be distinguished by, for example, querying whether the object exists, whether the object exists but has different properties or details, whether the object was accessed successfully, whether access to the object failed, whether the object was not accessed, or whether the object is dynamic. Dynamic objects are objects wherein the object state or an object attribute, such as size, changes during the execution of the application.

In one embodiment, given the numerous configuration differences that may exist, less important or insubstantial differences in the execution path, computer environment, application version, and OS version are distinguished from more serious discrepancies. For example, differences can be ranked on the basis of object states or combination of object states. In an embodiment, each state combination is assigned a priority that denotes its importance in detecting the root-cause of an application failure. Further, visual indicia can be assigned to each object state or combination of object states to aid a user in quickly identifying object states or combinations of object states.

Table 1 shows four object states with corresponding symbolic icons used for graphical representations of the object states. In one embodiment, the symbols in Table 1 are color coded to represent the source of the object corresponding to the symbol. For example, a red symbol can indicate that the corresponding object is found the problem application signature 210 and a green symbol can indicate that the corresponding object is found in the reference application signature 214 or reference computer 216.

TABLE 1

Symbolic representation of symbolic states

| Object State | Symbol |
| --- | --- |
| Object was accessed successfully | √ |
| Access to object failed | X |
| Object was not accessed | — |
| Dynamic object | ~ |

In one embodiment, the application signature analysis 220 function is configured to analyze sixteen (four-by-four) combinations of the four object states shown in Table 1 for the problem application signature 210 and the reference application signature 214. Each state combination has a corresponding combination of colored symbols and a priority that denotes its importance for detecting the source of the application failure.

In alternative embodiments, rather than ranking differences on the basis of object states, the configuration differences between the problem application signature 210 and the reference application signature 214 and/or the reference computer 216 can be configured by filtering objects by selected parameters such as name, extension or object type, selecting informative attributes for an object attribute comparison, or combining these methods and/or other methods to selectively rank, sort and compare the differences. The reference signature can be edited to specify multiple versions of application modules or to exclude non-relevant resources, Table 2 summarizes the possible state combinations during signature comparison by the application signature analysis 220 function, according to an embodiment. As shown in Table 2, each object state combination between the problem application signature 210 and the reference application signature 214 or reference computer 216 has a corresponding priority and symbol or "comparison icon." In an embodiment, the reference computer 216 objects provide information as to whether or not the object exists and, if a particular object does exist on the reference computer 216, whether or not the object has the same details as the corresponding problem application signature 210 object. Thus, whether or not the object on the reference computer 216 is accessed or dynamic is not applicable (N/A).

The "Priority" column indicates the relative importance of the observed object state difference to the analysis of the root-cause of the application error. In Table 2, priority is ranked on a scale of one to seven with a priority of "1" indicating the most probable cause or causes for error and a priority of "7" indicating the least probable cause or causes for error. In one embodiment, the detected differences are sorted by order of most probable cause for error. For the embodiment shown in Table 2, the most likely cause of an application failure is when the problem application signature 210 object does not exist or was accessed unsuccessfully when the reference application signature 214 object was accessed successfully or the reference computer 216 object exists.

In some cases, the object state combination may have little or no likelihood of causing the application error. As shown in Table 2, such object state combinations are not given a priority and the corresponding comparison icons are not shown. For example, when the problem application signature 210 object is accessed successfully and the reference application signature 214 object is accessed successfully with the same details, no priority is assigned and the comparison icons are not shown because this object state combination would be expected on a successful run of the application and does not appear to be the source of the problem.

TABLE 2

Object comparison rules

| Problem Application Signature | Reference Application Signature | Reference Computer | Comparison Icon | Priority |
|---|---|---|---|---|
| Object not accessed | <All cases> | N/A | Do not show | — |
| Object is dynamic | Object not accessed | N/A | ~ — | 7 |
| | Object accessed successfully | Object exists | ~ √ | 6 |
| | Object does not exist or accessed unsuccessfully | Object does not exist | ~ X | 6 |
| | Object is dynamic | N/A | Do not show | — |
| Object accessed successfully | Object not accessed | N/A | √ — | 5 |
| | Object accessed successfully - same details | Object exists - same details | Do not show | — |
| | Object accessed successfully - different details | Object exists - details different | √√ # | 2 |
| | Object does not exist or accessed | Object does not exist | √ X | 4 |
| | unsuccessfully Object is dynamic | N/A | √ ~ | 4 |
| Object does not exist or accessed unsuccessfully | Object not accessed | N/A | X X | 3 |
| | Object accessed successfully | Object exists | X √ | 1 |
| | Object does not exist or accessed unsuccessfully | Object does not exist | Do not show | — |
| | Object is dynamic | N/A | Do not show | — |

Application Signature User Model

According to an embodiment, a computer software system for troubleshooting configuration problems has several modes including, for example, a signature recording mode, a signature viewing mode, a signature editing mode, a signature comparison mode, etc.

Referring again to FIG. 1, in the signature recording mode, an API tracing engine implements an application signature creation process 100. In a preferred embodiment of the invention, tracing is implemented within a set of tracing and debugging tools that are collectively referred to as the API Tracer system ("API Tracer"). An embodiment of the API Tracer is discussed below. Signature recording is activated by an option in a graphical user interface (GUI) of the API Tracer software during the trace processing 108. The application signature 110 is stored in the signature repository 112. The signature repository 112 includes, for example, a designated file or database.

In the signature viewing mode, one or more GUI windows provide indication of the objects stored in the application signature 110 and their corresponding properties. FIGS. 3A-3E are exemplary illustrations of a signature viewer window 300, according to an embodiment. The signature viewer window 300 includes a plurality of tabs 302, 304, 306, 308, 310 for presenting information on system, files, registry, modules, and COM objects that have been traced during the signature recording mode. In one embodiment, the signature viewer window 300 includes an "Exclude mask" field 312 that allows a user to enter a desired pattern by which selected objects are filtered.

Figure 3A:
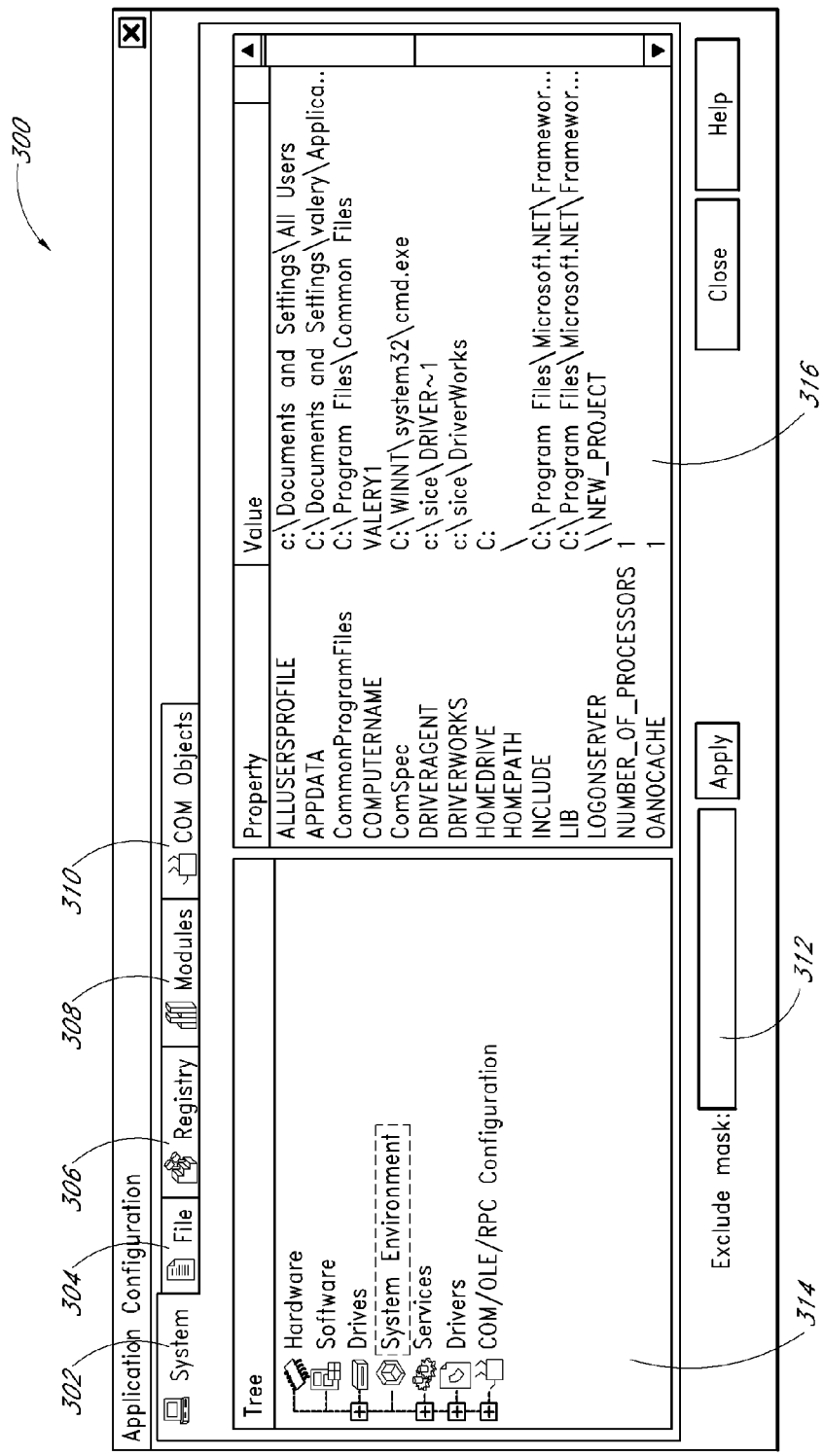
FIG. 3A is an illustration of a signature viewer window displaying system environment objects.

FIG. 3A illustrates the System tab 302 of the signature viewer window 300. The System tab 302 includes a system tree pane 314 configured to present a tree of the traced system elements. The System tab 302 further includes a system properties pane 316 configured to display the properties of a system element selected in the system tree pane 314. For example, the system properties pane 316 shown in FIG. 3A displays the properties and associated values of the "System Environment."

Figure 3B:
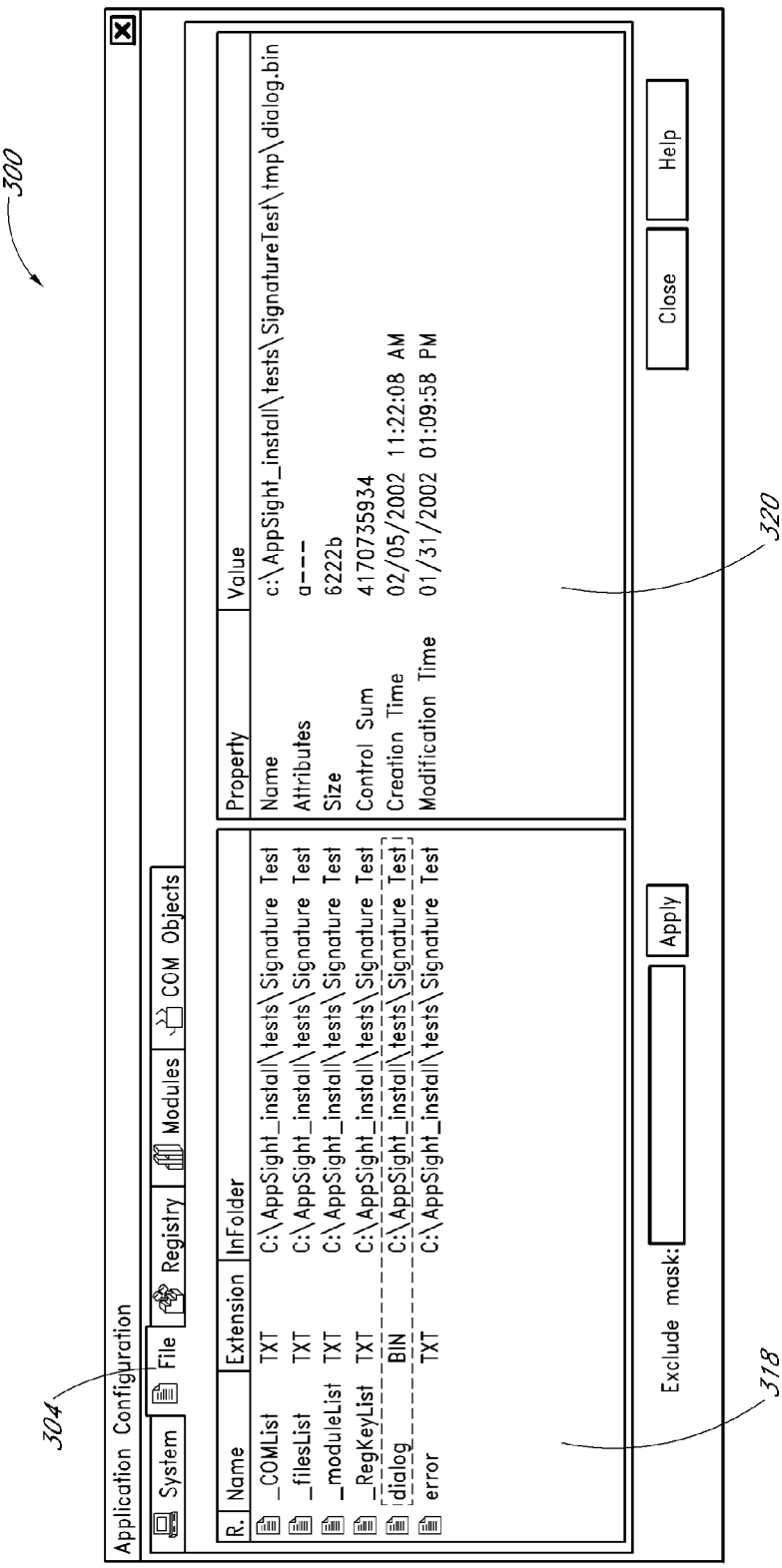
FIG. 3B is an illustration of a signature viewer window displaying file objects.

FIG. 3B illustrates the File tab 304 of the signature viewer window 300. The File tab 304 includes a file list pane 318 configured to present a list of traced files. The File tab 304 further includes a file properties pane 320 configured to display the properties of a file selected in the file list pane 318. For example, the file properties pane 320 shown in FIG. 3B displays the properties and associated values of the "dialog. bin" file.

Figure 3C:
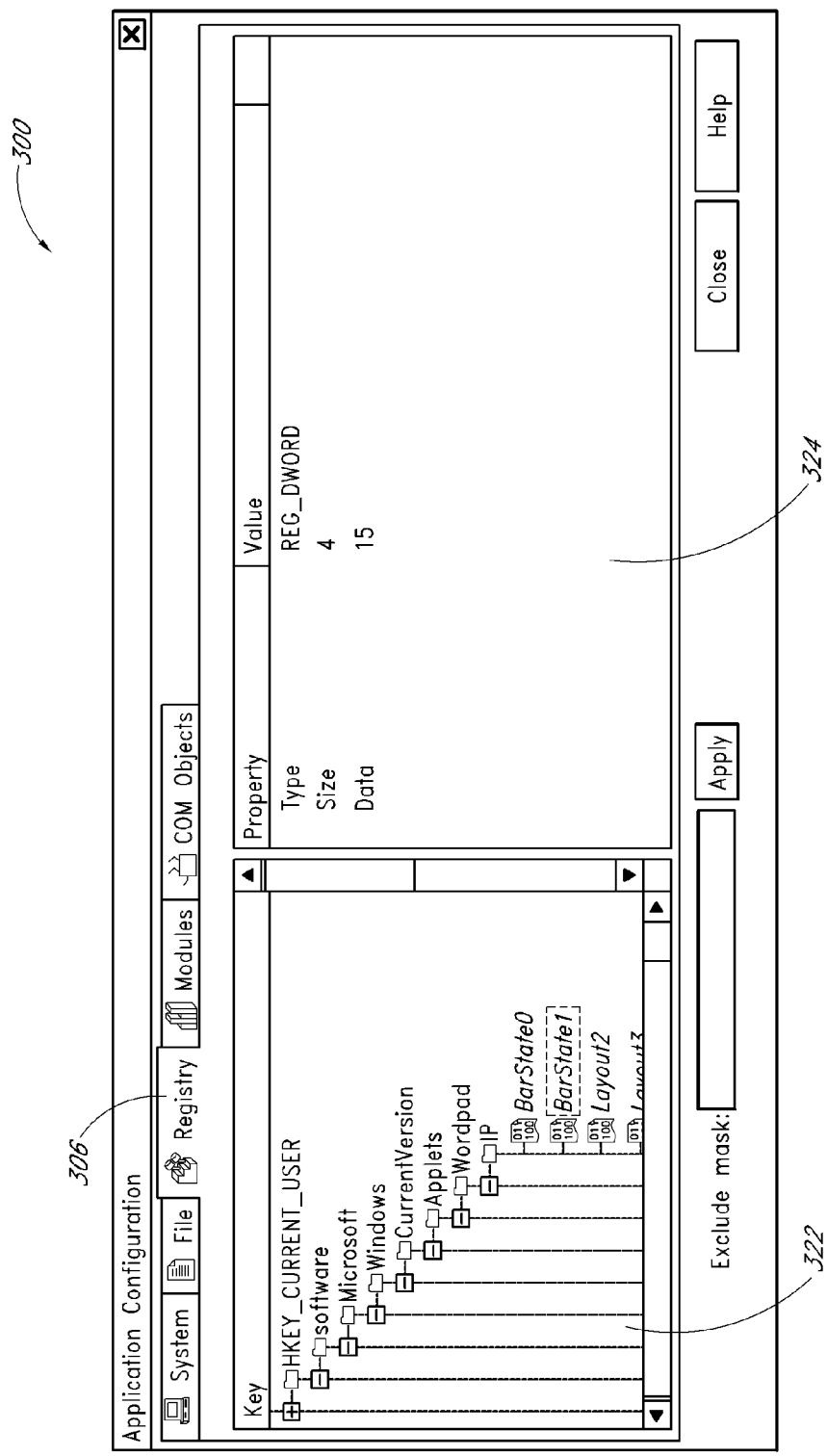
FIG. 3C is an illustration of a signature viewer window displaying Windows registry objects.

FIG. 3C illustrates the Registry tab 306 of the signature viewer window 300. The Registry tab 306 includes a registry tree pane 322 configured to present a tree of the traced registry operations. The Registry tab 306 further includes a registry key properties pane 324 configured to display the properties of a registry key selected in the registry tree pane 322. For example, the registry key properties pane 324 shown in FIG. 3C displays the properties and associated values of the "BarState1" registry key.

Figure 3D:
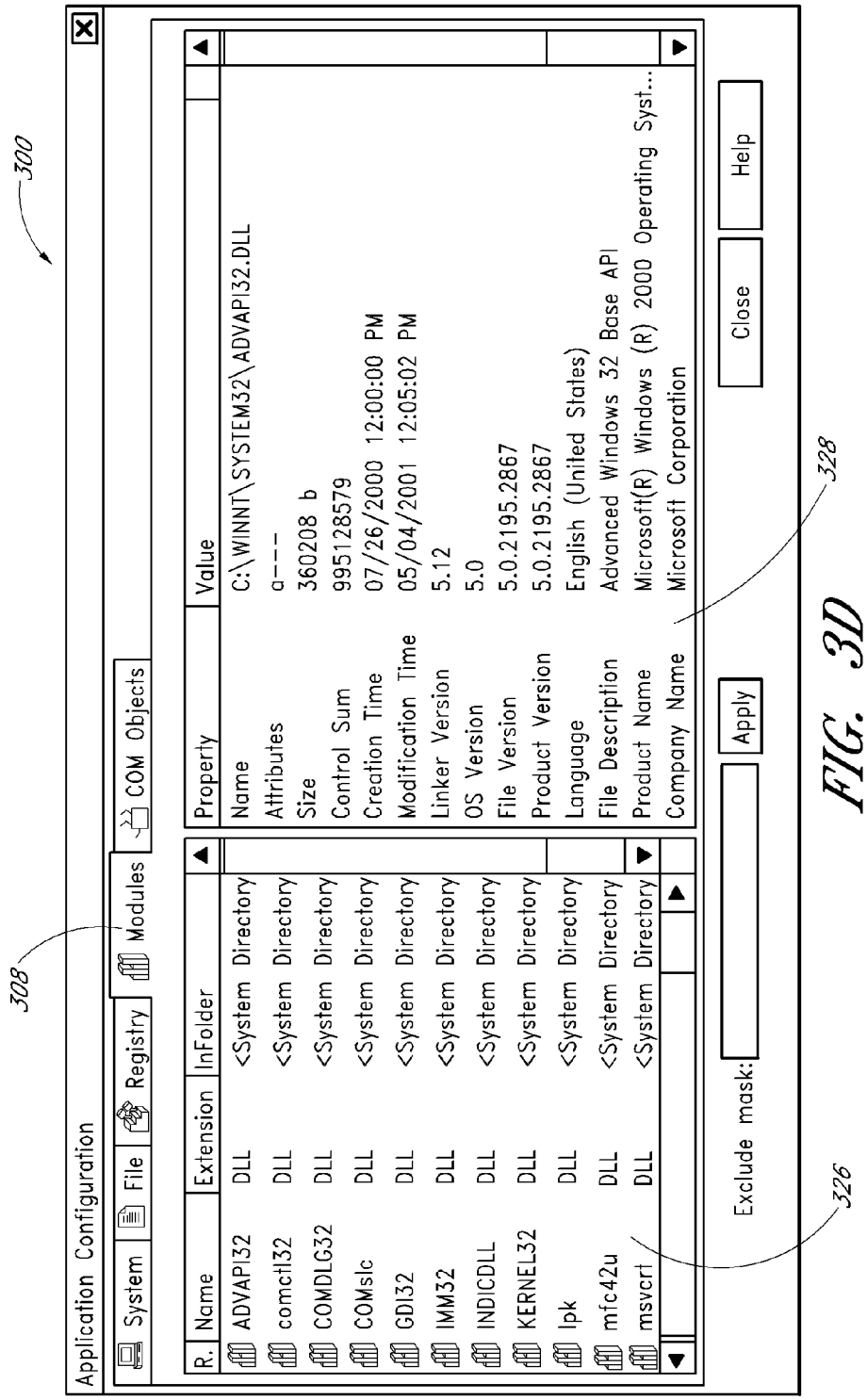
FIG. 3D is an illustration of a signature viewer window displaying module objects.

FIG. 3D illustrates the Modules tab 308 of the signature viewer window 300. The Modules tab 308 includes a module list pane 326 configured to present a list of the traced modules. The Modules tab 308 further includes a module properties pane 328 configured to display the properties of a module selected in the module list pane 326. For example, the module properties pane 328 shown in FIG. 3D displays the properties and associated values of the "ADVAPI32.DLL" module.

Figure 3E:
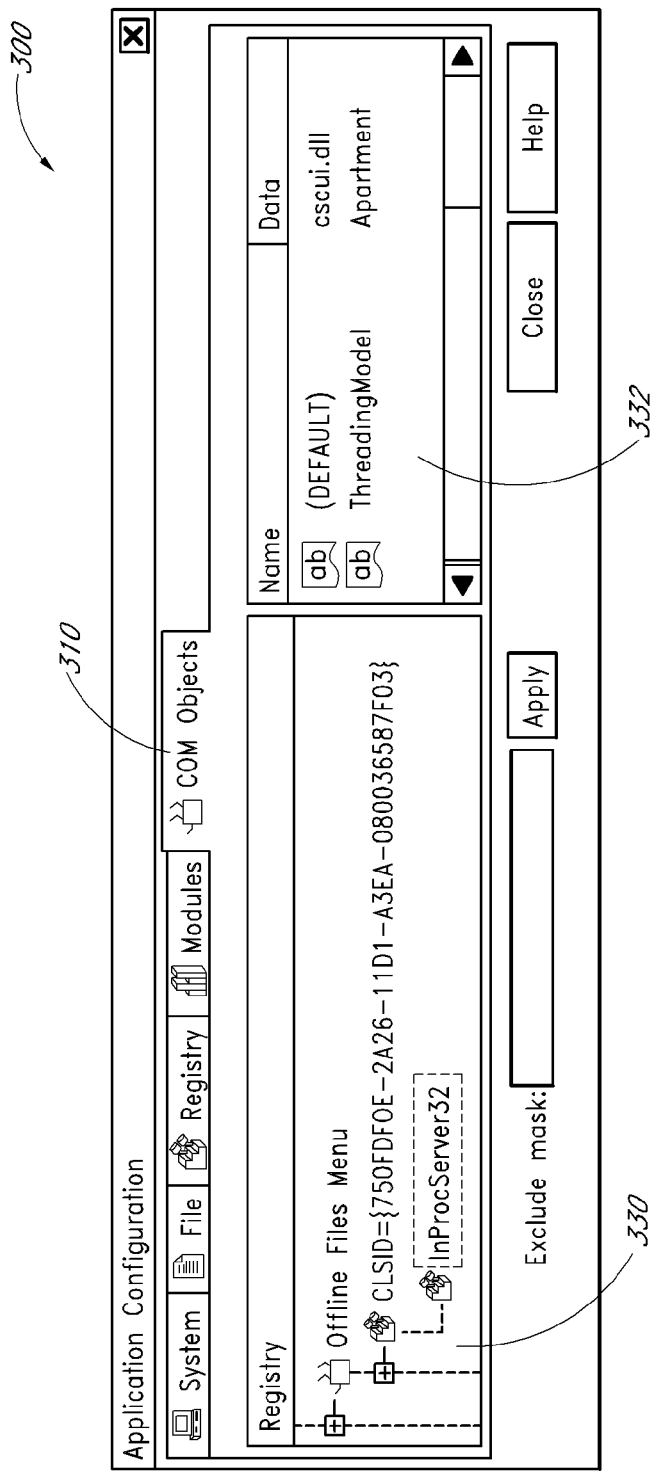
FIG. 3E is an illustration of a signature viewer window displaying COM objects.

FIG. 3E illustrates the COM Objects tab 310 of the signature viewer window 300. The COM Objects tab 310 includes a COM object tree pane 330 configured to present a tree of the traced COM objects. The COM Objects tab 310 further includes a COM object properties pane 332 configured to display the properties of a COM object selected in the COM object tree pane 330. For example, the COM object properties pane 332 shown in FIG. 3E displays the properties and associated values of the "InProcServer32" COM object.

In signature editing mode, a user can edit an application signature, such as the application signature 110 shown in FIG. 1. User edits to the application signature can include, by way of example only and not by limitation, deleting non-significant objects, updating object properties to include or remove a set of values, or marking properties as variable. The user can use the signature viewer window 300 shown in FIGS. 3A-3E to make the desired edits.

Figure 4A:
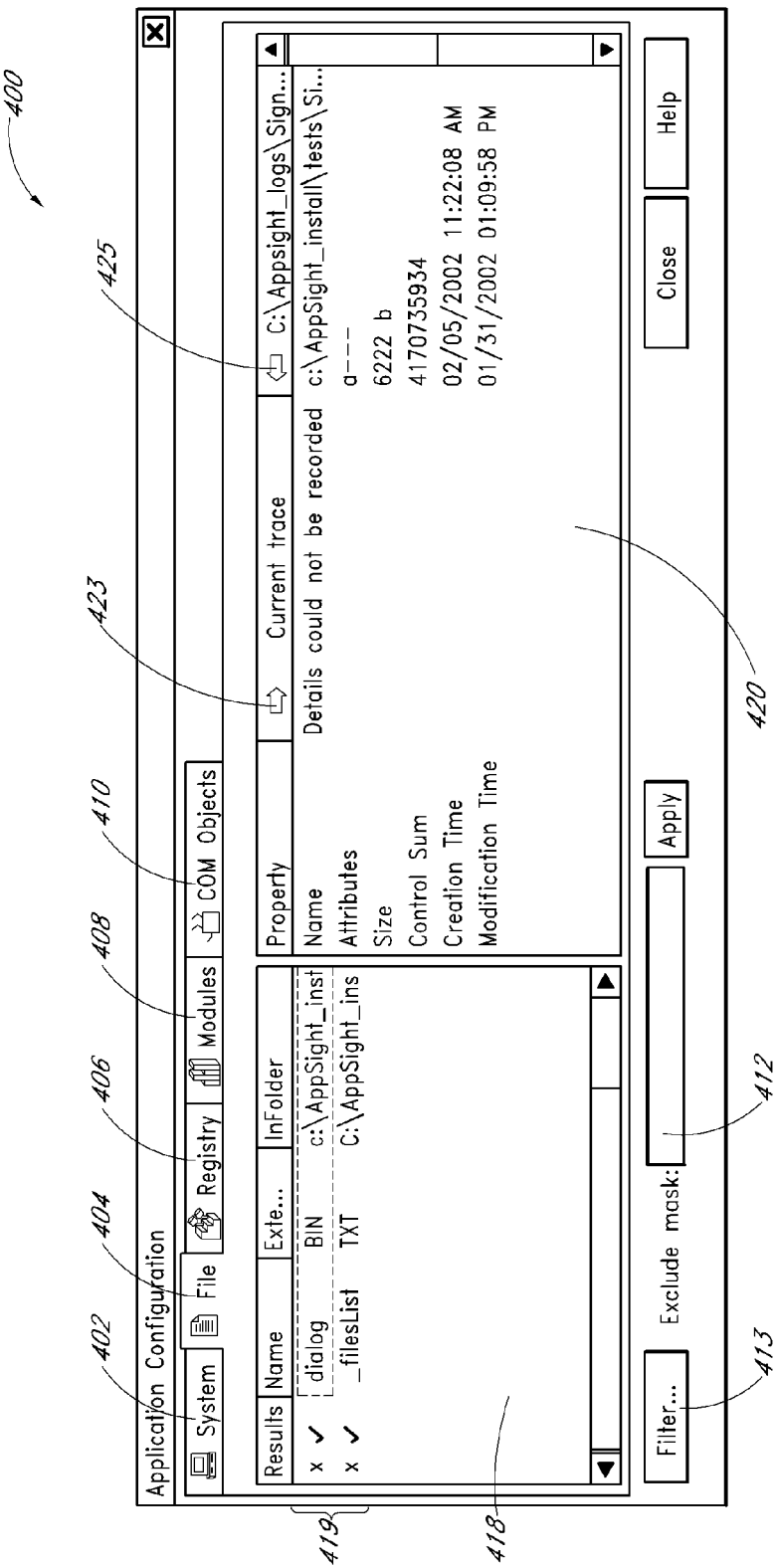
FIG. 4A is an illustration of a signature comparison window displaying differences in file objects.
Figure 4B:
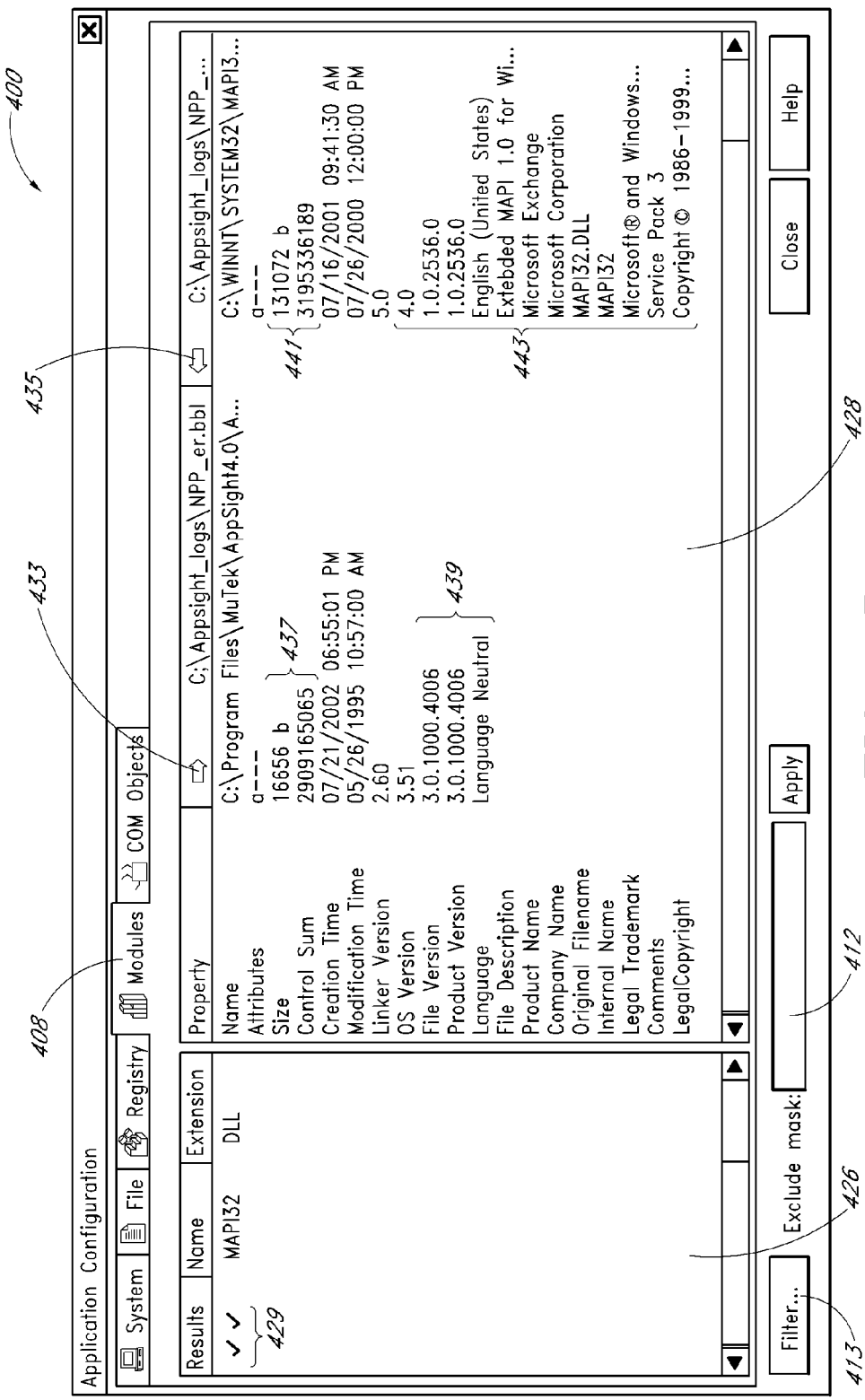
FIG. 4B is an illustration of a signature comparison window displaying differences in module objects.

Referring to FIG. 2 and FIGS. 4A-4B, in signature comparison mode, the user can compare a problem application signature 210 to the reference application signature 214 and/or the reference computer 216. The user can start the signature comparison procedure by selecting targets for comparison. Results of the comparison are presented in one or more GUI windows configured to show object differences. FIGS. 4A-4B illustrate a signature comparison window 400, according to an embodiment. The signature comparison window 400 includes a plurality of tabs 402, 404, 406, 408, 410 for presenting information on system, files, registry, modules, and COM objects that have been correlated between the problem application signature 210 and the reference application signature 214 and/or the reference computer 216 during the signature comparison mode.

FIG. 4A illustrates the File tab 404 of the signature comparison window 400. The File tab 404 includes a file list pane 418 configured to present a list of compared file objects having detected differences. The file list pane 418 is further configured to graphically represent results 419 of object state combinations for the problem application signature 210 and the reference application signature 214 or reference computer 216. For example, the symbols "X" and "√" correspond to the "dialog" file object shown in the file list pane 418. With regard to the discussion above referencing Table 1, the "X" symbol can also be colored red and indicates that access to the file object failed during the creation of the problem application signature 210. Similarly, the "√" symbol can also be colored green and indicates that the file object was accessed successfully during the creation of the reference application signature 214.

The File tab 404 further includes a file properties pane 420 configured to display the highlighted differences in the object properties of a file selected in the file list pane 418. For each property listed, the file properties pane 420 lists a corresponding value, if possible, for both the problem application signature 210 and the reference application signature 214 or reference computer 216. The file properties pane 420 can include visible indicia 423, 425 to notify the user as to the source of the corresponding value. For example, the file properties pane 420 shown in FIG. 4A displays a right pointing arrow 423 to indicate the current trace corresponding to the problem application signature and a left pointing arrow 425 to indicate a previous trace corresponding to the reference application signature 214. The right pointing arrow 423 can be colored red and the left pointing arrow 425 can be colored green to correspond with the color coding of the symbols listed in the corresponding results 419 of the file list pane 418.

FIG. 4B illustrates the Modules tab 408 of the signature comparison window 400. The Modules tab 408 includes a module list pane 426 configured to present a list of compared module objects having detected differences. The module list pane 426 is further configured to graphically represent results 433 of object state combinations for the problem application signature 210 and the reference application signature 214 or reference computer 216. As shown, the symbols "√√" correspond to the "MAPI32" module object. With regard to the discussion above referencing Table 1, the first "√" symbol can be colored red and indicates that the module object was accessed successfully during the creation of the problem application signature 210. Similarly, the second "√" symbol can be colored green and indicates that the module object was accessed successfully during the creation of the reference application signature 214.

The Module tab 408 further includes a module properties pane 428 configured to display the highlighted differences in the object properties of a module object selected in the module list pane 426. For each property listed, the module properties pane 428 lists a corresponding value, if possible, for both the problem application signature 210 and the reference application signature 214 or reference computer 216. The module properties pane 428 can include visible indicia 433, 1855 that can be color coded to notify the user as to the source of the corresponding value. For example, the right pointing arrow 433 can be colored red to indicate that properties listed in that column correspond to the problem application signature 210. Similarly, the left pointing arrow 435 can be colored green to indicate that properties listed in that column correspond to the reference application signature 214.

The Module tab 408 indicates that the comparison procedure detected a different version of "MAPI32.DLL." The property differences between versions is shown as highlighted or bolded text 437, 439, 441, 443 in the module properties pane 428. The bolded text 437, 439, 441, 443 can also be color coded to provide visual indicia of the source. For example, bolded text 437 and 439 can be colored red to indicate that the properties shown correspond to the problem application signature 210. Similarly, bolded text 441, 443 can be colored green to indicate that the properties shown correspond to the reference application signature 214. Thus, the signature comparison window 400 shows that the wrong dynamic linked library (DLL) version was loaded by the application causing it to change its expected behavior and stop working correctly. Such an occurrence is typically referred to as "DLL HELL" and is the detected root cause of the application failure.

Although not shown in FIGS. 4A-4B, the System tab 402, Registry tab 406, and COM Objects tab 410 each include at least two panes. A first pane is configured to present a list or tree of objects or files having detected differences. A second pane is configured to display differences in properties of the files or objects selected in the first pane.

In one embodiment, the signature comparison window 400 is configured to allow a user to filter out differences in compared objects that are of minor importance or merely add "noise" or confusion to the comparison process. Thus, the signature comparison window 400 includes an "Exclude mask" field 412 that allows a user to enter a desired pattern by which certain objects can be excluded from comparison.

Figure 5A:
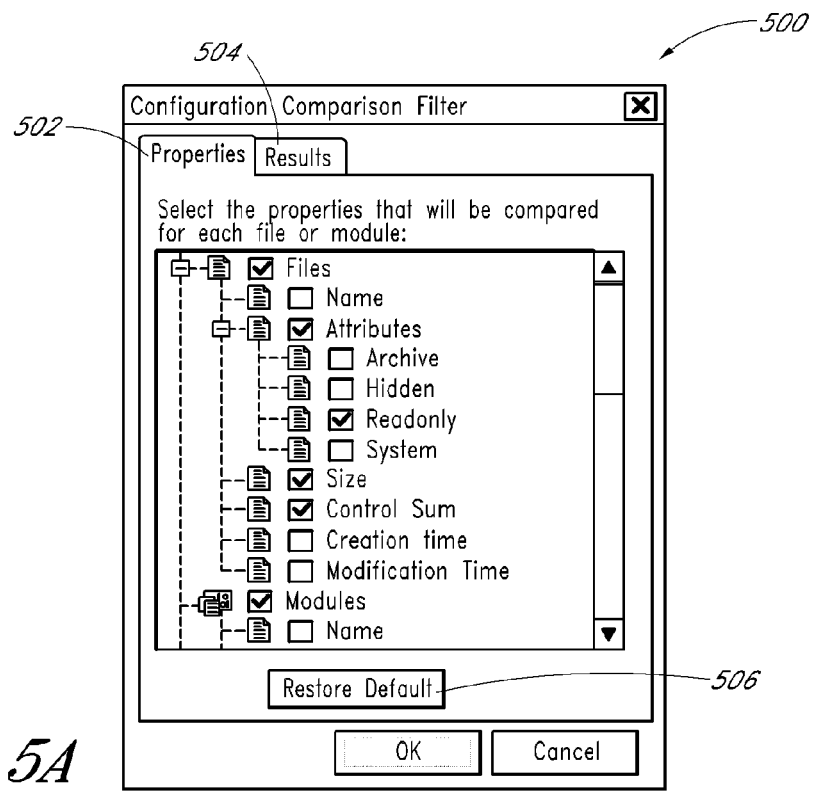
FIG. 5A is an illustration of a configuration comparison filter window configured to select properties of file objects that are taken into account for comparison.
Figure 5B:
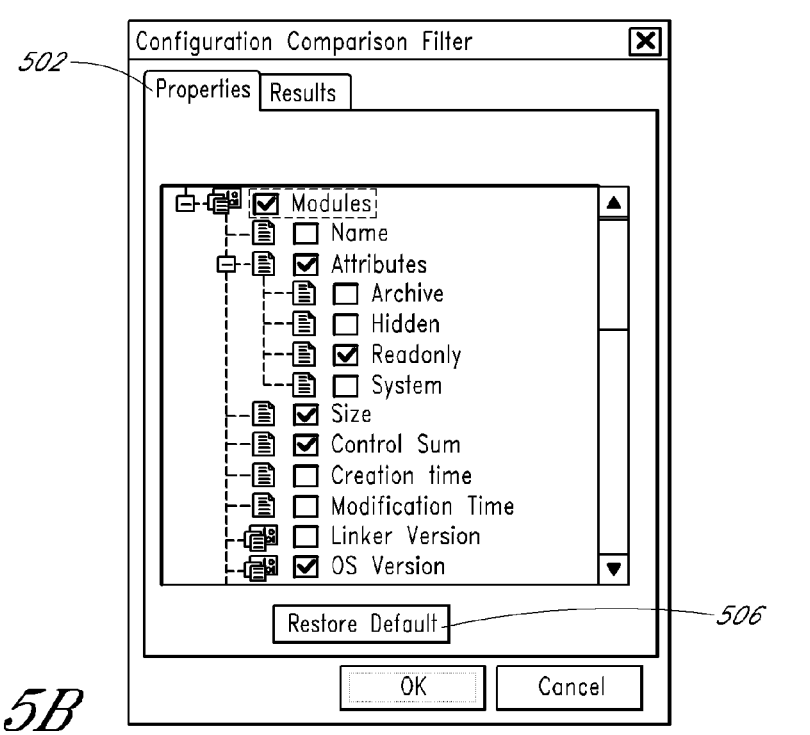
FIG. 5B is an illustration of a configuration comparison filter window configured to select properties of module objects that are taken into account for comparison.

The signature comparison window 400 can also include a "Filter" button 413 configured to allow an update of a default informative subset of properties and comparison results used for the comparison. By selecting the Filter button 413, the user opens a configuration comparison filter window 500 illustrated in FIGS. 5A-5C. The configuration comparison filter window 500 includes a Properties tab 502 and a Results tab 504. FIG. 5A illustrates a tree of properties that can be selected in the Properties tab 502 to be used for the comparison of files. FIG. 5B illustrates a tree of properties that can be selected in the Properties tab 502 to be used for the comparison of modules. The Properties tab 502 includes a "Restore Default" button 506 configured to select the default informative subset of file and object properties that will be used for the comparison of files and modules.

Figure 5C:
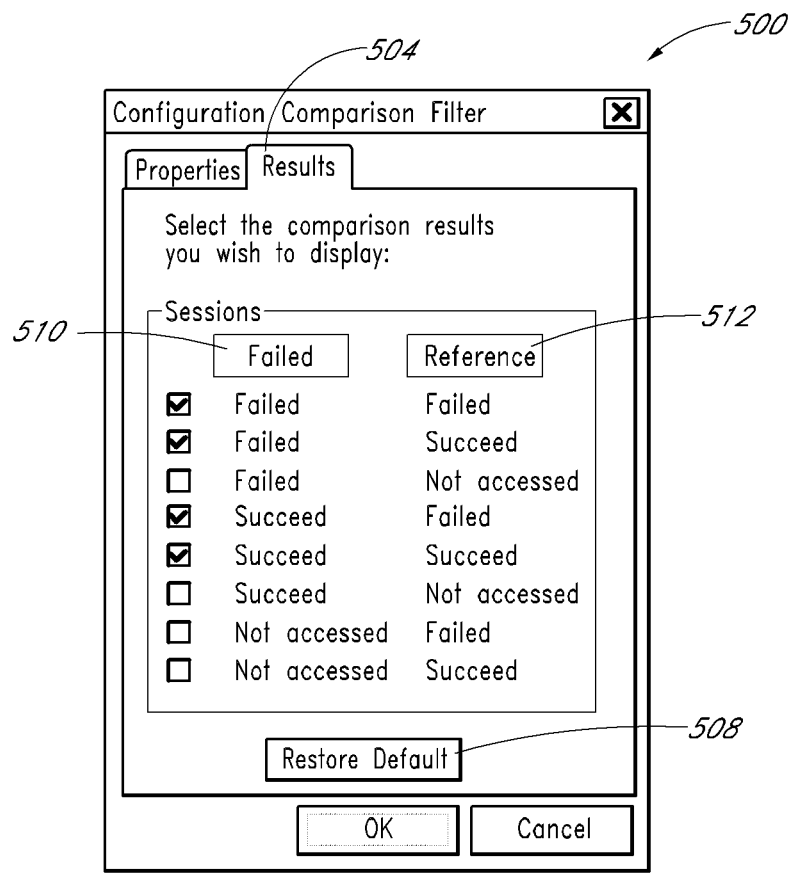
FIG. 5C is an illustration of a configuration comparison filter window configured to select pairs of object states for comparison filtering.

FIG. 5C illustrates a list of comparison results that can be selected in the Results tab 504 to be displayed. The comparison results are shown as combinations of object states for failed 510 objects corresponding to the problem application signature 210 and reference 512 objects corresponding to the reference application signature 214 or reference computer 216. See the discussion above related to Table 2 for a description of these object state combinations. The Results tab 504 includes a "Restore Default" button 508 configured to select a default subset of comparison results to display.

Overview of API Tracer System

As discussed above, the API Tracer 104 software is used to collect data to create an application signature. One feature of the API Tracer 104 is that it does not require special instructions or commands to be imbedded within the source code of the application or client, and it does not require any modifications to be made to the source or executable files of the client. "Tracing," or "to trace," refers generally to the process of using a monitoring program to monitor and record information about the execution of the client while the client is running. A "trace" generally refers to the information recorded during tracing. Unlike conventional debuggers that use breakpoints to stop the execution of a client, the API Tracer 104 can collect data while the client application 102 is running. Using a process called "attaching", the API Tracer 104 instruments the client application 102 by inserting interrupt instructions at strategic points defined by the API list 106 (such as function entry points) in the memory image of the client 102. This instrumentation process is analogous to the process of connecting a logic analyzer to a circuit board by connecting probes to test points on the circuit board. When these interrupts are triggered, the API Tracer 104 collects trace information about the client without the need for a context switch, and then allows the client to continue running.

Since the API Tracer 104 does not require modification to the client application 102, the API Tracer 104 can be used in a remote mode and/or in an online mode. Using remote mode a user can collect signature data from the remote execution of a program that has been shipped to an end user (e.g. a customer or beta user) without providing a special version of the code to the user, and without visiting the user's site or exposing the source code level details of the program to the user. The system can also be used in an online mode wherein the user can interactively trace a program and collect signature data in real time.

Using the API Tracer 104, tracing is accomplished by attaching to the memory image of the application 102 (i.e., the copy of the executable code that is loaded into RAM or other memory for execution). There is no need to enter trace points into, or to otherwise modify, the source, object, or executable files of the application 102. No special tracing version of the application 102 is needed, and the application 102 need not be written in any special manner. Attaching to the application 102 in memory allows function calls, returns, and other source lines to be traced. The attaching mechanism also allows for the tracing of any executable, including optimized (release) builds, multi-threading and multi-processes, long-jumps, signals, exceptions, and recursions.

The API Tracer 104 attaches to the application 102, in part, by modifying certain executable instructions of the memory image of the application 102. This process is generally called "executable code instrumentation," or simply "instrumentation." The instrumentation process is performed such that the functionality of the application 102 is preserved. Because the instrumentation is made only on the memory image, there is no need to pre-process or modify the source code or executable files of the application 102. Use of the API Tracer 104 provides significant advantages over the prior art by eliminating the need for context switches when tracing a program. Context switching has the effect of significantly slowing down the rate of execution. Although one skilled in the art will recognize that the present invention can advantageously be used with any operating system, various embodiments of the API Tracer 104 are described below in connection with the Windows-NT, Windows-2000, Windows-XP, Windows-2003 Windows-95 and Windows-98 type operating systems, with the understanding that the invention is not limited to said systems.

By using the callable functions, and system functions provided by the Win32 API (application program interface), the API Tracer 104 performs two major tasks: (1) attaching specialty functions to application, and (2) tracing the execution of the application's executable code. In the following description, the term "client process" is used to refer to the executable code of the application 102 that has been loaded into a memory space for execution.

The act of attaching to a currently running process is known as a process attach. The act of attaching to a new process, during the creation of the new process, in order to trace the new process from its start is known as a creation attach. In a creation attach it is desirable to pause the application 102 process as close as possible to its entry point so that virtually all of the functions executed by the application 102 will be traced.

In the above Windows-operating systems, each process resides at a distinct location or "address space" in memory. In one embodiment, the API Tracer 104 includes at least one DLL that resides in another address space and cannot simply be loaded into the same address space as the client process. To overcome this limitation, in one embodiment, one or more DLLs associated with the API Tracer 104 are loaded into the process space of the client process using a process called injection.

Attaching to a Client Running Under Windows-NT, 2000, XP and 2003

In a one embodiment, the injection process for process attach in Windows-NT, 2000, XP and 2003 is accomplished by using the CreateRemoteThread( ) function of the Win32 API, to create a remote thread in the client process and to force the newly created thread to run code in the client process. The code that is run by the remote thread is a copy of an injection function copied to the remote thread using the Win32 API WriteProcessMemory( ) function. The process attach involves the following sequence of events shown in FIG. 6 beginning with a procedure block 602 where an API Tracer function inst_attach( ) is called using the process ID ("PID") of the application (client) process as an argument. The function inst_attach( ) performs the following operations:

1) It obtains a handle to the client process using OpenProcess( );
2) It allocates memory in the client process's address space using the Win32 API function VirtualAllocEx( );
3) It copies the code for the injection function and other various data (including the full path of the APT Tracer) onto the allocated memory space using the WriteProcessMemory( ) function; and
4) It creates a new thread in the client process with CreateRemoteThread( ).

The new thread created in step 4 starts executing at the address to which the injection function was previously copied in step 3. The procedure then advances from the procedure block 602 to a procedure block 604 where the injection function starts running in the new thread of the client process. Using data passed to it via other parts of the memory space, the injection function loads the API Tracer 104.

The procedure advances from the procedure block 604 to a procedure block 606 where the API Tracer 104 runs in the context of the new thread while the instrumentation is taking place.

The procedure advances from the procedure block 606 to a procedure block 608 where the API Tracer 104 exits, and the injection function destroys its own thread and stops executing by calling the ExitThread( ) function. The application 102 can then continue to run without any substantial alteration of its functionality.

Creation Attach is accomplished under Windows-NT, 2000, XP and 2003 by creating the client process in a suspended state, by using the CREATE_SUSPENDED flag in the CreateProcess( ) function. In this case, the previously described procedure cannot be used, since none of the system DLLs in the client process have been initialized. In particular, since KERNEL32.DLL is not loaded, the API Tracer 104 cannot be loaded. The present attaching procedure overcomes this difficulty by performing the following attaching procedure, which begins at a procedure block 702 shown in FIG. 7.

To attach to a new application 102, the attaching procedure begins in block 702, in which the client process is created in a CREATE_SUSPENDED state. The attaching procedure then advances to a procedure block 704. In the procedure block 704, the API Tracer makes a call to the inst_prepare( ). The inst_prepare function, using WriteProcessMemory( ) and VirtualAllocEx( ), allocates memory in the client process and copies a small assembly language code segment into the allocated space. The procedure then proceeds to a procedure block 706 where the inst_prepare function overwrites the entry point of the client executable in the client process with a jump instruction to the new assembly code. The attaching procedure then advances to a procedure block 708 wherein the inst_prepare function allows the client process to resume, and thereby start the initialization process for the client process. After all DLLs are initialized, including the API Tracer 104, execution continues to the entry point of the client executable, which now contains a jump to the new assembly code. When the jump occurs, the attaching procedure advances from the procedure block 708 to a procedure block 710. In the procedure block 710, the assembly code restores the original client entry point, and suspends the client process. At this point, the client process is suspended without running any executable code, but is past the initialization stage. The attaching procedure then advances to a procedure block 712.

In the procedure block 712, the API Tracer 104 can now call inst_attach( ) to attach to the client process and start instrumenting it. When the attaching procedure is complete, it can allow the client process to resume. The assembly code simply jumps directly back to the original entry point of the application 102, and execution of the application 102 starts with the proper instrumentation.

Attaching to a Client Running Under Windows-95/98

In Windows-95, Process Attach and Creation Attach are implemented in a manner different from the Windows-NT, 2000, XP and 2003 manner discussed above because the CreateRemoteThread API call is not supported in this operating system.

Creation Attach under Windows-95 exploits the fact that process initialization starts from a known entry point of kernel32.dll. API Tracer 104 creates the client process in the suspended mode and then calls to the inst95_attach function. This function performs the following sequence of operations:

1) It initializes the communication channel for IPC with the client process.
2) It copies various data (such as the Injection Function code) into the client's address space, using WriteProcessMemory function.
3) It initializes a shared heap memory.
4) It copies onto the heap a small piece of assembler code (a patch) that executes the jump to the function that creates thread in the client process
5) It copies the injection function itself
6) It patches the entry point of kernel32.dll so that the entry point points to the shared heap address where the assembler code is located. Because of the lack of "Copy on Write" mechanism in Windows-95, this patching applies also to the client process.
7) It resumes the main thread of the client process.
8) In the client process, the entry point of kernel32.dll is called and, thus, the applied patch starts execution. The patch performs the following operations:
   a) The patch removes the patch applied on the kernel32.dll entry point and restores the original kernel32.dll code.
   b) The patch creates a new thread, which runs the injection function.
   c) The injection function loads the trace library.
   d) The injection function initializes the trace library 125 and the communication channel in the client process.
9) If inst95_attach returns successfully, then the initial instrumentation of the client process is done and the tracing begins.

During a Process Attach, API Tracer 104 calls the inst95_attach_to_running_process function. The inst95_attach_to_running_process function executes the following sequence of operations:

1) It initializes the communication channel for IPC with a client process
2) It calls a function create_remote_thread (not to be confused with the CreateRemoteThread API call in Windows-NT), that performs the following operations:
   a) It allocates memory on the shared heap.
   b) It copies various data (such as the Injection Function code and the path for the trace library) onto the heap
   c) It finds a valid thread handle from the client process.
   d) It suspends the valid thread
   e) It sets the single step flag in the valid thread context
   f) It releases the valid thread A device driver, which will be further described below, intercepts the INT 1 interrupt that is caused by the first executed instruction of the above mentioned valid thread. Upon receiving the interrupt, the device driver sets the instruction pointer to the start address of the injection function that was copied onto the shared heap, and clears the single step flag in the valid thread context. After clearing the single step flag, the driver proceeds as if the interrupt was successfully handled, and returns the control to Windows-95.

Since the instruction pointer now points to the injection function, the injection function starts to execute in the context of the client process. The injection function continues as in the case of Creation Attach described above and creates a new thread that subsequently performs the loading into the address space of the client 102.

In order to leave the interrupted valid thread intact, the injection function executes the breakpoint instruction, which immediately causes an INT 3 interrupt that is intercepted by the device driver. The device driver restores the thread context that was stored immediately after the thread was suspended and then the device driver returns the control to Windows-95.

Tracing Execution

The trace function involves tracing the execution of the instrumented client process and reporting certain events to API Tracer 104. The API Tracer 104 accomplishes the tracing function by using breakpoints, and by reporting information concerning the status of the client process upon reaching the breakpoints.

After the client process has been attached, the process of tracing the execution of the client 102 involves the steps of installing breakpoints, triggering breakpoints, and catching breakpoints. Breakpoints are installed by overwriting the target address of the assembly instruction to be traced with an INT 3 instruction, occupying a single byte of space. The original byte at that address, along with other information, is stored in a data structure created by API tracer 104. The data structure, which describes all trace points, is preferably a hash table comprising a corresponding array of records for each hash value. The hashing is implemented with the target address as a parameter, allowing for a very fast searching for information concerning a trace point by using its address.

Breakpoints are triggered whenever the target address gets executed. When the target address is executed, the breakpoint instruction generates an INT 3 interrupt. On Windows NT this interrupt is handled by the Windows-NT kernel-mode handler. The kernel-mode handler transfers the execution to the user-mode routine KiUserExceptionDispatcher inside NTDLL.DLL (the system DLL). The KiUserExceptionDispatcher routine handles the task of locating a corresponding exception filter for the particular kind of exception.

Catching of breakpoints occurs within the context of the client 102. With standard debuggers, control would pass to the debugger process at this point. API Tracer 104, takes a new approach, eliminating the need for context switching to properly trace the execution (for better performance). Since no context switching takes place, control remains with the client 102.

A patch can be applied to the KiUserExceptionDispatcher function, having the effect of forcing a call to a function in the API Tracer 104 before processing the exception. This function (the API Tracer 104 exception handler), determines whether the breakpoint occurred as a result of the tracing or for another reason. An exception that is not the result of tracing (i.e., no trace point has been installed at this target address) will result in a return of execution to KiUserExceptionDispatcher. When an exception is the result of the tracing, the handler notifies the appropriate routines and defers the breakpoint, thereby allowing the original instruction at the target address to execute.

To defer a breakpoint, the original byte at the target address is restored, returning execution while setting a trap flag in the FLAGS register of an x86 processor. The trap flag causes an INT 1 interrupt to occur as a result of the execution of the original instruction. This interrupt is also treated as an exception, eventually reflecting into the API Tracer 104 exception handler. The handler restores the breakpoint instruction at the target address and returns for second time, allowing the client process code to continue running as if nothing happened.

In Windows 95/98, interception of the INT3 and INT1 interrupts is done by a device driver. The driver registers its interrupt handler for INT1 and INT3 interrupts. When the interrupt handler is called, it checks to see if the interrupt occurred in the context of the client process. If the interrupt occurred in the client process, then the interrupt handler passes back on its stack any data needed by the function (such as thread context). After this function handles the trace point, it triggers an additional INT 3 interrupt that is recognized by the device driver. The device driver acts as if the interrupt has been successfully handled, causing the traced thread to continue execution. When the device driver recognizes that an interrupt has occurred not in the context of the client process, then the device driver passes the interrupt to the operating system interrupt handler (thus not affecting the normal behavior of other programs in the system or the operating system itself).

When tracing a plain source line (e.g., not a function entry or exit point), the API Tracer 104 inserts data in the trace buffer to indicate that a trace point has been reached. When reaching a function entry trace point (apart from writing data to the trace buffer) a special mechanism is used because tracing of information regarding both the entry to and exit from the function is desired. This is preferably accomplished by modifying the return address of the function. The return address is located on the stack. The original return address is saved and a new return address point is inserted. The new return address points to a special assembly stub. Therefore, when the function returns the assembly stub is called. The stub reports that the function has exited, and this is written to the trace buffer. The stub then jumps to the real return address of the function.

In certain environments it is possible for a function to be entered but not properly exited. The function ceases running (with its stack erased and execution continuing elsewhere), but never returns to its caller. Therefore, for tracing purposes, it never returned to the API Tracer 104 assembly stub. For example, this would happen when a C++ exception occurs inside the a function and the exception handler at an outer function instructs the function generating the exception to exit, or when the setjmp( )/longjmp( ) functions are used in C/C++ programs. To detect and trace such events, the microprocessor's stack pointer register (ESP) is checked whenever a trace point triggers to determine whether any functions have exited. The stack pointer normally grows down. Its position is registered at the entry of each function together with the above-mentioned return address. If the stack pointer has moved to a higher point than that at entry, the function is deemed to have exited. Several different redundant checks are also performed to ensure the reliability of this mechanism.

The API Tracer 104 also supports the tracing of DLLs for which no debug information is available, such as system DLL's. The tracing of such DLLs is accomplished by tracking the exported functions used by the DLLs. This is done by analyzing the DLL exported function table in the client 102 to retrieve information concerning the exported function names and addresses.

Although the present invention has been described with reference to specific embodiments, other embodiments will occur to those skilled in the art. It is to be understood that the embodiments described above have been presented by way of example, and not limitation, and that the invention is defined by the appended claims.

What is claimed is:

1. A system for troubleshooting a configuration problem of an application, the application including at least an executable code representation, the system comprising:
    at least one processor;
    a non-transitory computer-readable storage medium including instructions executable by the at least one processor, the instructions configured to implement:
    a first code module that attaches to a first memory image of the application, the first code module configured to trace a first execution of the application, the application using a first software configuration that is properly functioning, and to store data reflecting the first execution in a first application signature, the first application signature containing first data representing properties of first system resources that interact with the application during the first execution;
    a second code module that attaches to a second memory image of the application, the second code module configured to trace a second execution of the application using a second software configuration that is malfunctioning and to store data reflecting the second execution in a second application signature, the second application signature containing second data representing properties of second system resources that interact with the application during the second execution; and
    a third code module configured to correlate the first application signature to the second application signature,
    the third code module configured to provide a display of the first system resources and the second system resources that have been correlated to a computer system display screen to help a computer system user identify a reason for the malfunction,
    the third code module being configured to assign a priority to each of a plurality of combinations of object states of the first data of the first application signature and object states of the second data of the second application signature based on an importance of a respective combination for identifying a root-cause of the malfunction, the priority indicating a level of likelihood in determining a reason for the malfunction.

2. The system of claim 1, further comprising a fourth code module configured to select the properties of the first system resources and the second system resources to be traced by the first code module and the second code module.

3. The system of claim 2, wherein the second code module is configured to execute separately from the first, third and fourth code modules, the system thereby enabling remote evaluation of the second software configuration.

4. The system of claim 1, wherein the third code module is further configured to translate the first application signature and the second application signature into a human-readable form and to display a comparison of the translated trace information on the computer system display screen.

5. A computer-implemented method for troubleshooting a configuration problem of an application, the application including at least an executable code representation, the method comprising:
    attaching a first code module to a first memory image of the application, the first code module configured to trace a first execution of the application, the application using a first software configuration that is properly functioning, the first code module configured to store data reflecting the first execution in a first application signature, the first application signature containing first data representing properties of first system resources that interact with the application during the first execution;
    attaching a second code module to a second memory image of the application, the second code module configured to trace a second execution of the application using a second software configuration that is malfunctioning and to store data reflecting the second execution in a second application signature, the second application signature containing second data representing properties of second system resources that interact with the application during the second execution;
    correlating, by a first code module, the first application signature to the second application signature; and
    providing a display of the first system resources and the second system resources that have been correlated to a computer system display screen to help a computer system user identify a reason for the malfunction,
    wherein a priority is assigned to each of a plurality of combinations of object states of the first data of the first application signature and object states of the second data of the second application signature based on an importance of a respective combination for identifying a root-cause of the malfunction, the priority indicating a level of likelihood in determining a reason for the malfunction.

6. The computer-implemented method of claim 5, further comprising:
    selecting, by a fourth code module, the properties of the first system resources and the second system resources to be traced by the first code module and the second code module.

7. The computer-implemented method of claim 6, wherein the second code module is configured to execute separately from the first, third and fourth code modules, the method thereby enabling remote evaluation of the second software configuration.

8. The computer-implemented method of claim 5, further comprising:
    translating, by the third code module, the first application signature and the second application signature into a human-readable form and to display a comparison of the translated trace information on the computer system display screen.

9. A non-transitory computer-readable medium storing instructions that when executed cause at least one processor to troubleshoot a configuration problem of an application, the application including at least an executable code representation, the instructions comprising instructions to:
    attach a first code module to a first memory image of the application, the first code module configured to trace a first execution of the application, the application using a first software configuration that is properly functioning, the first code module configured to store data reflecting the first execution in a first application signature, the first application signature containing first data representing properties of first system resources that interact with the application during the first execution;
    attach a second code module to a second memory image of the application, the second code module configured to trace a second execution of the application using a second software configuration that is malfunctioning and to store data reflecting the second execution in a second application signature, the second application signature containing second data representing properties of second system resources that interact with the application during the second execution;

correlate, by a first code module, the first application signature to the second application signature; and provide a display of the first system resources and the second system resources that have been correlated to a computer system display screen to help a computer system user identify a reason for the malfunction, wherein a priority is assigned to each of a plurality of combinations of object states of the first data of the first application signature and object states of the second data of the second application signature based on an importance of a respective combination for identifying a root-cause of the malfunction, the priority indicating a level of likelihood in determining a reason for the malfunction.

10. The non-transitory computer-readable medium of claim 9, further comprising:

selecting, by a fourth code module, the properties of the first system resources and the second system resources to be traced by the first code module and the second code module.

11. The non-transitory computer-readable medium of claim 10, wherein the second code module is configured to execute separately from the first, third and fourth code modules, the method thereby enabling remote evaluation of the second software configuration.

12. The non-transitory computer-readable medium of claim 9, further comprising:

translating, by the third code module, the first application signature and the second application signature into a human-readable form and to display a comparison of the translated trace information on the computer system display screen.

* * * * *